United States Patent
Murphy et al.

(10) Patent No.: US 10,344,767 B2
(45) Date of Patent: Jul. 9, 2019

(54) METHOD FOR COMPRESSOR SURGE DETECTION TO ENABLE MODEL BASE AIR ESTIMATION

(71) Applicant: GM GLOBAL TECHNOLOGY OPERATIONS LLC, Detroit, MI (US)

(72) Inventors: Shawn W Murphy, Livonia, MI (US); Andrew J Kosanka, Atlas, MI (US); Jay S Meldrum, Novi, MI (US); Layne K Wiggins, Dexter, MI (US); Adam J Heinzen, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 90 days.

(21) Appl. No.: 15/582,949

(22) Filed: May 1, 2017

(65) Prior Publication Data
US 2018/0313356 A1    Nov. 1, 2018

(51) Int. Cl.
| | |
|---|---|
| *G01M 15/04* | (2006.01) |
| *F04D 27/00* | (2006.01) |
| *G01M 15/08* | (2006.01) |
| *F04D 17/10* | (2006.01) |
| *F04D 25/02* | (2006.01) |

(52) U.S. Cl.
CPC ........... *F04D 27/001* (2013.01); *F04D 17/10* (2013.01); *F04D 25/024* (2013.01); *G01M 15/08* (2013.01)

(58) Field of Classification Search
USPC ................ 73/112.05, 114.32, 114.33, 114.77
See application file for complete search history.

(56) References Cited

U.S. PATENT DOCUMENTS

| | | | | |
|---|---|---|---|---|
| 5,746,062 | A * | 5/1998 | Beaverson | F04D 27/001 62/129 |
| 2013/0156544 | A1* | 6/2013 | Sishtla | F04D 27/0261 415/1 |
| 2014/0069377 | A1* | 3/2014 | Brennan | F02D 41/0002 123/350 |
| 2014/0350735 | A1* | 11/2014 | Zhang | G05D 7/0617 700/282 |
| 2016/0025596 | A1* | 1/2016 | Heda | G01M 15/14 73/112.06 |
| 2016/0160868 | A1* | 6/2016 | Xiao | F04D 17/10 415/1 |
| 2017/0074276 | A1* | 3/2017 | Dahinten | F04D 27/02 |
| 2017/0370368 | A1* | 12/2017 | Srivastava | F04D 27/001 |
| 2018/0216623 | A1* | 8/2018 | Krishnababu | F04D 27/001 |

* cited by examiner

*Primary Examiner* — Eric S. McCall

(57) ABSTRACT

A method for compressor surge detection to enable model based air estimation includes determining if an intake air compressor pressure ratio is within a predetermined surge pressure range. Then the differences between mass air flow sensor signals measured at a start and finish of each count of a predetermined string length counter when the compressor pressure ratio is within the predetermined surge pressure range. Next, a transition is made to an air mass estimation model output signal from a mass air flow sensor signal when a sum of the air flow differences is greater than a predetermined compressor surge threshold.

14 Claims, 2 Drawing Sheets

METHOD FOR COMPRESSOR SURGE DETECTION TO ENABLE MODEL BASE AIR ESTIMATION

TECHNICAL FIELD

The present invention generally relates to air charger systems, and more particularly relates to a method for compressor surge detection to enable model based air estimation.

BACKGROUND

Air charger systems are turbine-driven forced induction devices that increases an internal combustion engine's efficiency and power output by forcing extra air into the combustion chamber. This improvement over a naturally aspirated engine's power output is due to the fact that an intake air compressor can force more air into the combustion chamber than atmospheric pressure alone.

An air charger system can create high pressure outputs from the intake air compressor and low mass flow rates, possibly lower than what the engine needs to run, when the engine throttle body is closed rapidly which can lead to compressor surge or a back flow of air.

In order to promote optimal combustion within an engine cylinder, a manifold absolute pressure sensor is used to provide manifold pressure information to an engine controller for calculating air density, which in turn is used to determine fuel metering per cylinder needed to obtain optimal combustion. However, the manifold absolute pressure (MAP) sensor may not be capable of detecting the changes in manifold pressure that occur during compressor surge events which, if it could, would cause the engine to run off a speed density calculation of air for fuel metering. Accordingly, there is a need for a reliable means to detect compressor surge in an air charger system to enable model based air estimation for fuel metering.

Furthermore, other desirable features and characteristics of the present exemplary embodiment will become apparent from the subsequent detailed description of the embodiment and the appended claims, taken in conjunction with the accompanying drawings and this background.

BRIEF SUMMARY

One or more exemplary embodiments address the above issue by providing a method for compressor surge detection to enable model based air estimation for an air charger system.

According to an aspect of an exemplary embodiment, a method for compressor surge detection to enable model based air estimation includes determining if a compressor pressure ratio is within a predetermined surge pressure range. Still another aspect as according to the exemplary embodiment includes determining air flow differences between mass air flow sensor signals measured at a start and end of each count of a predetermined string length counter when the compressor pressure ratio is within the predetermined surge pressure range. And another aspect includes transitioning to an air mass estimation model output signal from a mass air flow sensor signal when a sum of the air flow differences is greater than a predetermined compressor surge threshold.

Another still aspect of the exemplary embodiment includes returning to or using the mass air flow sensor signal when the compressor pressure ratio is not within the predetermined surge compressor range or the sum of the differences is less than the predetermined compressor surge threshold. Yet a further aspect wherein determining the compressor pressure ratio includes calculating a ratio between throttle inlet air pressure and turbo charger air inlet pressure. And another aspect in accordance with the exemplary embodiment includes determining the compressor pressure ratio using a throttle inlet air pressure sensor and a turbocharger inlet air pressure sensor.

Yet another aspect of the exemplary embodiment wherein determining further includes using manifold air pressure, intake camshaft position, exhaust camshaft position, and engine speed (RPM) as inputs to the air mass estimation model. And still another aspect in accordance with the embodiment wherein transitioning further includes outputting air mass per cylinder values to an engine controller from the air estimation model. Another aspect in accordance with the embodiment wherein transitioning further includes using a speed density air mass model calculation.

BRIEF DESCRIPTION OF THE DRAWINGS

The present exemplary embodiment will hereinafter be described in conjunction with the following drawing figures, wherein like numerals denote like elements.

DETAILED DESCRIPTION

The following detailed description is merely exemplary in nature and is not intended to limit the embodiment or the application and uses thereof. Furthermore, there is no intention to be bound by any theory presented in the preceding background or the following detailed description.

Figure 1:
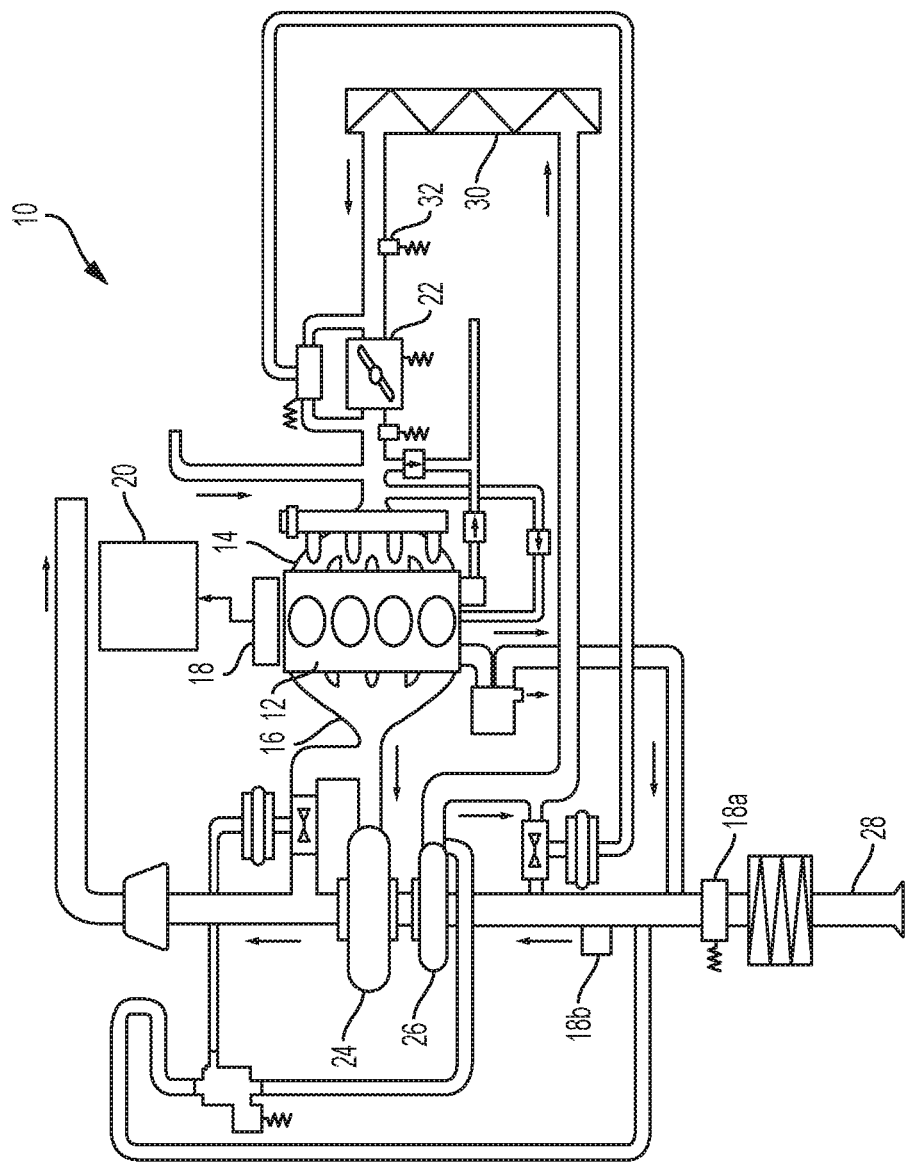
FIG. 1 is an illustration of a diagram of an air charger system for utilizing a method for compressor surge detection to enable model based air estimation in accordance with aspects of an exemplary embodiment.

In accordance with the disclosed embodiment, FIG. 1 is an illustration of a system diagram of an air charger system 10 for describing a method for compressor surge detection to enable model based air estimation in accordance with aspects of an exemplary embodiment. An engine 12 includes an engine intake manifold 14 and an exhaust manifold 16. Sensors 18 are in communication with the engine 12 and include, but not limited to, a mass air flow (MAF) sensor 18a for figuring out the mass flow rate of air entering fuel injected cylinders of an engine and a turbo charger intake air pressure (TCIAP) sensor 18b for measuring absolute pressure of air entering the air charger system 10. Various other sensors include a crankshaft position sensor, an intake camshaft position sensor, an exhaust camshaft position sensor, and a wheel speed sensor in accordance with the exemplary embodiment.

An engine controller unit (ECU) 20 is in communication (not shown) with the engine throttle body 22 and the engine intake manifold 14. The engine throttle body 22 regulates the flow of air into the engine intake manifold 14 and is operative to be controlled by the engine controller unit (ECU) 20 for managing such regulation in accordance with the exemplary embodiment. Sensors 18 are in communication with the engine controller unit (ECU) 20 for providing input signals representative of various vehicle parameters including such signals as a throttle inlet air pressure sensor, manifold air pressure (MAP) signal, a barometric pressure signal, a crankshaft position signal, and various other sensor signals in accordance with the exemplary embodiment.

The air charger system 10 also includes an air charger exhaust turbine 24 in mechanical communication via a shaft to an air charger compressor 26 that is operative to improve the engine's volumetric efficiency by increasing density of the intake air. The air charger compressor 26 draws in ambient air from the air inlet 28 and compresses the air drawn in before it enters into a charge air cooler 30. The air charger compressor 26 heats the air drawn into the air charger system 30 to a temperature that must be reduced before it can be delivered to the engine intake manifold 14 at increased pressure. A throttle inlet air pressure (TIAP) sensor 32 is operative to sense the intake air pressure at the outlet of the charge air cooler 30 before it is drawn through the engine throttle body 22 into the engine intake manifold 14.

Figure 2:
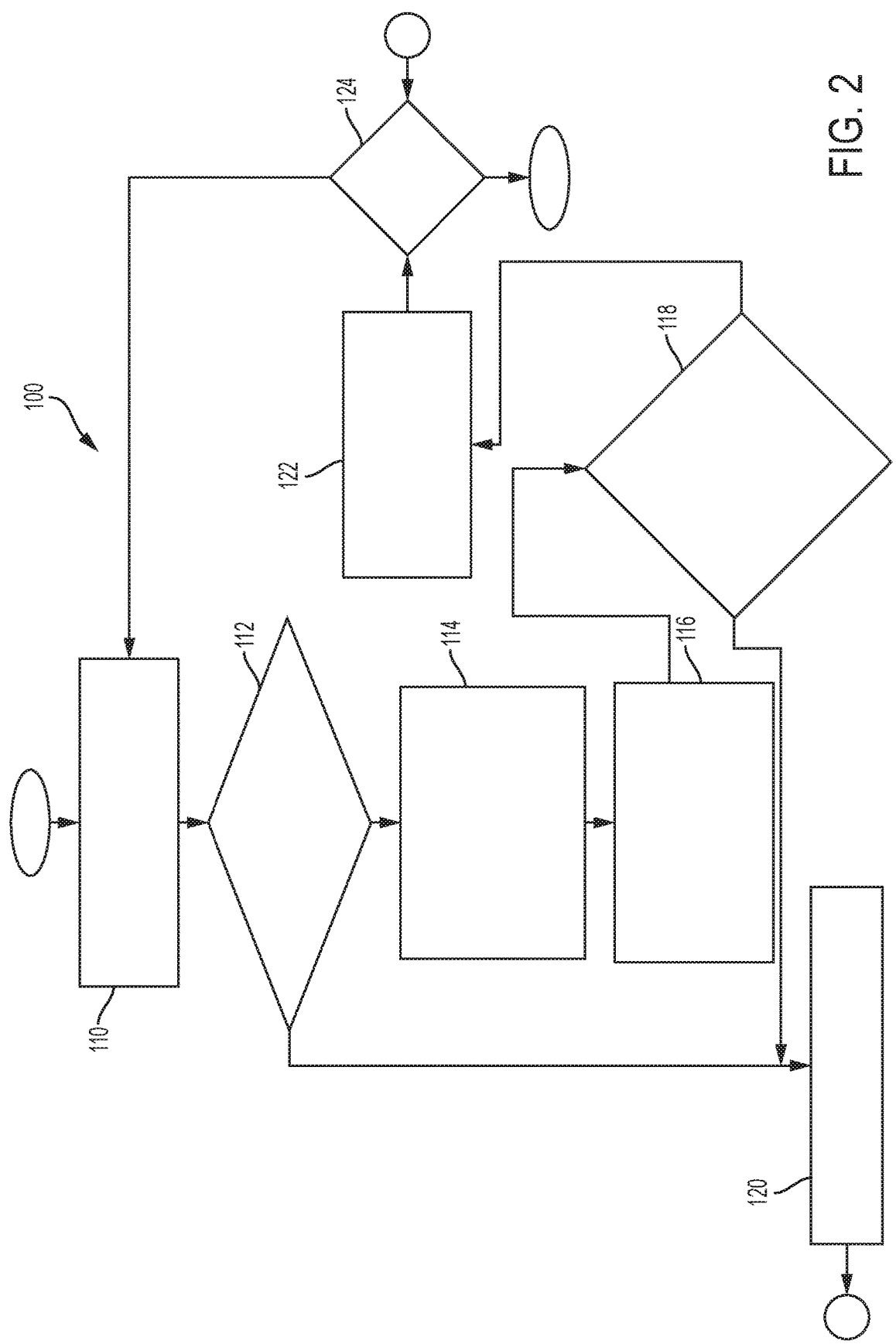
FIG. 2 is an illustration of a flowchart diagram that illustrates a method for compressor surge detection to enable model based air estimation for an air charger system in accordance with aspects of the exemplary embodiment.

An air charger system 10 can create high pressure outputs from the air charger compressor 26 and low mass flow rates when the engine throttle body 22 is closed rapidly which can lead to compressor surge or a back flow of air. This back flow of air (or pulsations of air) can cause the MAF sensor 18a output signal to exhibit oscillations making it difficult for the engine control unit (ECU) 20 to get an accurate reading of the mass flow rate. As such, the engine control unit (ECU) 20 must rely on the model based air estimation, more particularly in accordance with the exemplary embodiment, a speed density air mass calculation based air estimation model, rather than the MAF sensor 18a output for ensuring a more accurate air per cylinder value is used in the fuel mass calculation to facilitate efficient combustion. It is appreciated that other model based air estimation models may also be used to facilitate the proper operation of an air charger system experiencing compressor surge conditions but, however, it is not contemplated that the use of such air estimation models will exceed the scope of the exemplary embodiment Referring now to FIG. 2, a flowchart diagram 100 that illustrates a method for air charger compressor 26 surge detection to enable model based air estimation for an air charger system 10 in accordance with aspects of the exemplary embodiment is presented. At block 110, the method begins with calculating and determining if the air charger compressor 26 ratio is within a predetermined surge pressure range detecting if the engine is operating at a steady state condition during part load. The air charger compressor ratio is determined by calculating a ratio between the throttle inlet air pressure and the turbo charger air inlet pressure.

Next, at block 112, if the air charger compressor pressure ratio is within the predetermined surge pressure range then the method continues to block 114. If the air charger compressor pressure ratio is not within the predetermined surge pressure range then the method continues at block 120 where the ECU continues to use, or returns to using, the mass air flow sensor signal to calculate the air per cylinder value needed for the fuel mass calculation. It is appreciated that the ECU determines the fuel mass in part based on the signal received from the MAF sensor or from the output of the model based air estimation and then commands the fuel injectors to inject an appropriate amount of fuel into the engine cylinders according to the air per cylinder (APC) value used.

At block 114, the method continues with determining the air flow differences between mass air flow sensor signals measured at a start and end of each count of a predetermined string length counter when the air charger compressor pressure ratio is within the predetermined surge pressure range. A string length counter is a mechanism for counting a series (string) or predetermined length (number) of equal time periods during which a specific event occurs. For example, in this case, the string length counter may have a length of ten (10) equal periods of 15 ms and, at the start and end of each 15 ms period, a measurement of the mass air flow sensor signal is read by the ECU. The ECU then calculates the difference of the mass air flow sensor signal readings (start and end) for each 15 ms period and stores the values.

At block 116, the method continues with determining a sum of the air flow differences measured by the MAF sensor and stored from each count of the predetermined string length counter. At block 118, if the sum of the differences measured by the MAF sensor during the string length counter is not greater than a predetermined compressor surge threshold then the method continues at block 120 where the ECU continues to use, or returns to using, the mass air flow sensor signal when the compressor pressure ratio is not within the predetermined surge compressor range or the sum of the differences is less than the predetermined compressor surge threshold.

Referring again to block 118, if the sum of the differences measured by the MAF sensor during the string length counter is greater than a predetermined compressor surge threshold then the method continues at block 122 where the air charger system transitions from using the MAF sensor output signal to using the model based air estimation output signal to calculate the air per cylinder (APC) value used by the ECU to determine the proper amount of fuel per cylinder.

Next, at block 124 the method continues with determining if the engine is still on. If so, then the method returns to block 110 to continue the method. If not, the method ends, and then starts on the next ignition cycle.

The detailed description provides those skilled in the art with a convenient road map for implementing the exemplary embodiment or exemplary embodiments. Many modifications and variations will be apparent to those of ordinary skill in the art without departing from the scope and spirit of the invention. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for compressor surge detection to enable model based air estimation comprising:
determining if a compressor pressure ratio is within a predetermined surge pressure range;
generating, using a mass air flow sensor, mass air flow sensor signals indicative of air flow;
determining air flow differences between the mass air flow sensor signals generated from the mass air flow sensor measured at a start and end of each count of a predetermined string length counter when the compressor pressure ratio is within the predetermined surge pressure range;
summing the air flow differences; and transitioning to using, in order to control an engine throttle body by an engine controller unit, an air mass estimation model output signal generated by an air mass estimation model from the mass air flow sensor signals generated by the mass air flow sensor when the sum of the air flow differences is greater than a predetermined compressor surge threshold.

2. The method of claim 1 further comprising returning to or using the mass air flow sensor signal when the compressor pressure ratio is not within the predetermined surge compressor range or the sum of the differences is less than the predetermined compressor surge threshold.

3. The method claim 1 wherein determining the compressor pressure ratio comprises calculating a ratio between throttle inlet air pressure and turbo charger air inlet pressure.

4. The method of claim 1 further comprising determining the compressor pressure ratio using a throttle inlet air pressure sensor and a turbocharger inlet air pressure sensor.

5. The method of claim 1 wherein determining further comprises using manifold air pressure, intake camshaft position, exhaust camshaft position, and engine speed (RPM) as inputs to the air mass estimation model.

6. The method of claim 1 wherein transitioning further comprises outputting air mass per cylinder values to an engine controller from the air estimation model.

7. The method of claim 1 wherein the air mass estimation model includes a speed density air mass model calculation.

8. A method for compressor surge detection to enable model based air estimation comprising:
   determining if a compressor pressure ratio is within a predetermined surge pressure range;
   generating, using a mass air flow sensor, mass air flow sensor signals indicative of air flow;
   determining air flow differences between the mass air flow sensor signals generated from the mass air flow sensor measured at a start and end of each count of a predetermined string length counter when the compressor pressure ratio is within the predetermined surge pressure range;
   summing the air flow differences;
   transitioning to using, in order to control an engine throttle body by an engine controller unit, an air mass estimation model output signal generated by an air mass estimation model from the mass air flow sensor signals generated by the mass air flow sensor when the sum of the air flow differences is greater than a predetermined compressor surge threshold; and
   returning to using, by the engine controller unit, the mass air flow sensor signals when the compressor pressure ratio is not within the predetermined surge compressor range or the sum of the air flow differences is less than the predetermined compressor surge threshold.

9. The method of claim 8 wherein determining the compressor pressure ratio comprises calculating a ratio between throttle inlet air pressure and turbo charger air inlet pressure.

10. The method of claim 8 further comprising determining the compressor pressure ratio using a throttle inlet air pressure sensor and a turbocharger inlet air pressure sensor.

11. The method of claim 8 further comprises using manifold air pressure, intake camshaft position, exhaust camshaft position, and engine speed (RPM) as inputs to the air mass estimation model.

12. The method of claim 8 wherein transitioning further comprises outputting air mass per cylinder values to an engine controller from the air estimation model.

13. The method of claim 8 wherein transitioning further comprises using a speed density air mass model calculation.

14. A method for compressor surge detection to enable model based air estimation comprising:
   calculating a compressor pressure ratio between a throttle inlet air pressure generated by a throttle inlet air pressure sensor and a turbo charger air inlet pressure generated by a turbocharger inlet air pressure sensor;
   determining if the compressor pressure ratio is within a predetermined surge pressure range;
   generating, using a mass air flow sensor, mass air flow sensor signals indicative of air flow;
   determining air flow differences between the mass air flow sensor signals generated from the mass air flow sensor measured at a start and end of each count of a predetermined string length counter when the compressor pressure ratio is within the predetermined surge pressure range;
   summing the air flow differences;
   controlling, using an engine control unit, an engine throttle body using an air mass estimation model output signal generated by an air mass estimation model when the sum of the air flow differences is greater than a predetermined compressor surge threshold; and
   controlling, using the engine control unit, the engine throttle body using the mass air flow sensor signals when the compressor pressure ratio is not within the predetermined surge compressor range or the sum of the air flow differences is less than the predetermined compressor surge threshold.

\* \* \* \* \*